(12) United States Patent
Anderson et al.

(10) Patent No.: US 6,507,363 B1
(45) Date of Patent: *Jan. 14, 2003

(54) METHOD AND SYSTEM FOR AUTOMATICALLY GENERATING A PLURALITY OF FOLDERS FOR MULTIPLE DEVICES AND MULTIPLE SESSIONS IN A DIGITAL CAMERA

(75) Inventors: Eric C. Anderson, San Jose, CA (US); Patricia Scardino, Fremont, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/040,727

(22) Filed: Mar. 18, 1998

Related U.S. Application Data (63) Continuation-in-part of application No. 08/780,396, filed on Jan. 8, 1997, now Pat. No. 5,861,918.

(51) Int. Cl.$^7$ .................................................. H04N 5/76
(52) U.S. Cl. ........................................ 348/233; 348/231
(58) Field of Search ................................ 348/207, 211, 348/230, 231, 232, 233; 358/909.1; 709/206, 204, 205, 207, 219, 250; 386/38, 45, 117, 118, 121, 125

(56) References Cited

U.S. PATENT DOCUMENTS

| | | | |
|---|---|---|---|
| 5,528,293 A | | 6/1996 | Watanabe .................... 348/231 |
| 5,633,678 A | * | 5/1997 | Parulski et al. ............. 348/232 |
| 5,706,457 A | * | 1/1998 | Dwyer et al. ................ 345/835 |
| 5,719,987 A | | 2/1998 | Kawamura et al. .......... 386/120 |
| 5,861,918 A | * | 1/1999 | Anderson et al. ........... 348/233 |
| 5,940,121 A | * | 8/1999 | Mcintyre et al. ........... 348/207 |
| 6,169,575 B1 | * | 1/2001 | Anderson et al. ........... 348/231 |
| 6,188,431 B1 | * | 2/2001 | Oie ............................. 348/211 |
| 6,204,877 B1 | * | 3/2001 | Kiyokawa .................... 348/211 |
| 6,239,837 B1 | * | 5/2001 | Yamada et al. ............. 348/231 |
| 6,310,647 B1 | * | 10/2001 | Parulski et al. ............. 348/232 |

* cited by examiner

*Primary Examiner*—Aung S. Moe
(74) *Attorney, Agent, or Firm*—Sawyer Law Group LLP

(57) ABSTRACT

The present invention provides a method and system for automatically generating a plurality of folders for multiple devices in a digital camera. The method and system comprises providing a folder of images from a digital camera and embedding an image file format in the folder, wherein the image file format identifies the particular camera. In a preferred embodiment, the image file format comprises a TIFF structure. Through this mechanism, a one level folder system can be utilized to retrieve images. In addition, since the image file format identifies the camera, conflicts due to identical serial numbers are eliminated.

3 Claims, 12 Drawing Sheets

Make
Model
Serial No.
Camera Name        — 502
Copyright
Count Mode
External File Count

TIFF STRUCTURE

METHOD AND SYSTEM FOR AUTOMATICALLY GENERATING A PLURALITY OF FOLDERS FOR MULTIPLE DEVICES AND MULTIPLE SESSIONS IN A DIGITAL CAMERA

CROSS-REFERENCE TO RELATED APPLICATIONS

The present application is a continuation in part of application Ser. No. 08/780,396, entitled "A Method and System for Managing A Removable Memory in a Digital Camera" filed on Jan. 8, 1997 now U.S. Pat. No. 5,861,918, and assigned to the assignee of the present application.

FIELD OF THE INVENTION

The present invention relates generally to digital cameras, and more particularly to a method and system for generating a plurality of folders used in a digital camera.

BACKGROUND OF THE INVENTION

Modern digital cameras typically include an imaging device which is controlled by a computer system. The computer system accesses raw image data captured by the imaging device and then processes and compresses the data before storing the compressed data into an internal memory. Efficient operation of the computer is therefore an important consideration for camera designers and manufacturers. The memory architecture of a particular computer system determines data storage techniques and can thus significantly effect the operational efficiency of the entire digital camera system.

The user interface in conventional digital cameras typically includes a view finder in which small versions of the captured images may be displayed to allow a user to review several images at once. By selecting one of the images, the user may then display the full-sized version of the images in the view finder.

The images captured by the digital camera are typically named by numbering the images starting with an initial number, such as the number one, and ending with a maximum number. The images displayed in the view finder may then be identified by their assigned numbers. Once the maximum number of images has been named, the user must delete the images or download the images to a host computer in order to clear the camera's memory. Thereafter, the camera begins naming new images starting with the number one again.

This conventional method for naming images results in several naming conflicts that may result in some images being overwritten and lost. One type of naming conflict occurs in cameras that are equipped with some type of removable storage medium for storing images. For instance, assume that the removable memory, such as a flash disk, includes a series of old images that are named from one to the maximum number as described above. If the user begins capturing images, the camera will begin naming the new images starting with the number one since the maximum number has been reached. This results in the old images stored on the removable memory being overwritten by the new images that have the same names.

Another type of naming conflict occurs when conventional cameras are connected to a host computer for transferring images. Assuming that both the host computer and the camera include stored images, then both the host computer and the camera may have a set of images with the same names. If any attempt is made to the download images from the host computer to the camera, then the images with the conflicting names in the camera may be overwritten. Similarly, if any attempt is made to upload images from the camera to the host computer, then the images in the host computer with the conflicting names may be overwritten.

A method for minimizing the naming conflicts that occur in a digital camera is disclosed in co-pending U.S. patent application Ser. No. 08/761,854, entitled "A System And Method For Naming Images In A Digital Camera Device" filed on Dec. 9, 1996. In this method, the digital camera maintains a count of the total number of captured images stored in the camera, and then incorporates this number in the name assigned to each image. Although this creates unique image names for the images captured by a particular camera because the nonrepeating count total, naming conflicts may still arise when a single removable memory device is used to store images from a number of different cameras, because each camera will eventually generate the same images names.

Another method for minimizing conflicts is described in copending U.S. patent application Ser. No. 08/780,369 entitled, "A Method and System for Managing a Removable Memory in a Digital Camera" filed on Jan. 8, 1997. This method includes creating a camera folder on the removable memory corresponding to the digital camera when the removable memory is first inserted into the digital camera. When images are captured by the digital camera, the images are stored only in that folder. In a preferred embodiment, the folder is made unique by generating a name for the folder from the serial number assigned to the digital camera.

Figure 1:
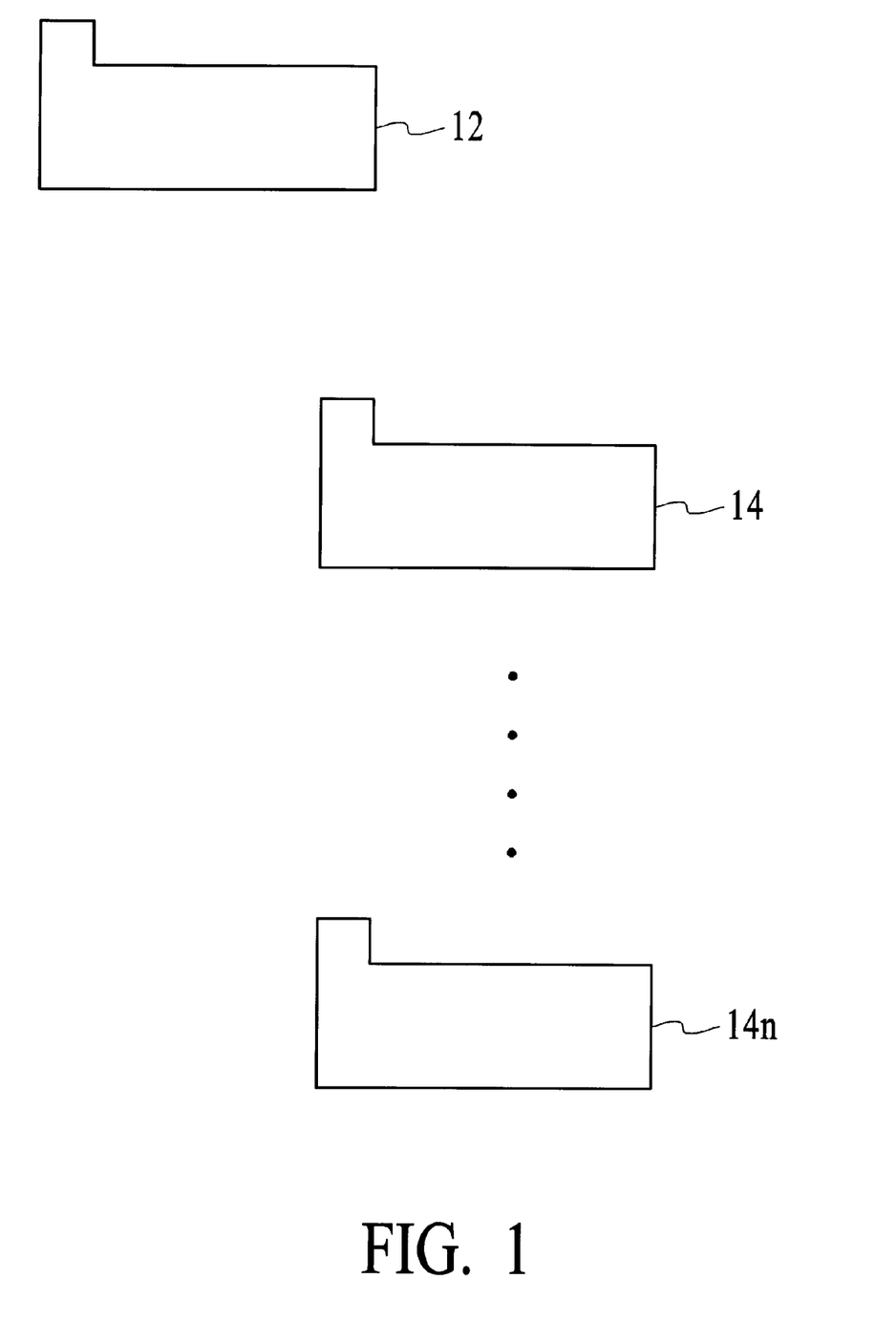
FIG. 1 is a conventional hierarchy for storing images in a digital camera.

Although these systems work adequately in some environments, they do not operate efficiently as the number of images are increased. Referring now to FIG. 1, what is shown is a conventional hierarchy for storing images in a digital camera. In such a hierarchy, there are a plurality of camera folders, 102, one folder per camera. In such a hierarchy, each camera is identified by a serial number. The serial number is utilized to identify the particular folder that is to be accessed. As the number of images increases within a particular folder, to minimize the complexity in the mechanism for searching for a particular image each folder will include a plurality of subfolders or session folders $14_1$ through $14_n$ for retaining images from a particular picture-taking session. Accordingly, a two-level system is required in the conventional hierarchy to allow for retrieval of the images in an efficient manner.

A first problem with this kind of hierarchy is that as the number of subfolders increases, the processing required to retrieve images becomes greater. A second problem is that if a particular serial number is identical for two different cameras, for example, if the cameras are from different manufacturers, then conflicts will occur. If there is this identity of serial numbers, then there is the possibility that a particular folder for a first camera will be accessed by a second camera. Thereafter the second camera will overwrite the information that is already present within that folder.

Accordingly, what is needed is a system and method that overcomes the above-identified problems. What is desired is to reduce the complexity in such a system and also make it easier for one to access a particular image within a folder. The system should be easy to implement, cost-effective, and should not add significant complexity to the digital camera system. The present invention addresses such a need.

SUMMARY OF THE INVENTION

The present invention provides a method and system for automatically generating a plurality of folders for multiple devices in a digital camera. The method and system comprises providing a folder of images from a digital camera and embedding an image file format in the folder, wherein the image file format identifies the particular camera. In a preferred embodiment, the image file format comprises a TIFF structure. Through this mechanism, a one level folder system can be utilized to retrieve images. In addition, since the image file format identifies the camera, conflicts due to identical serial numbers are eliminated.

DESCRIPTION OF THE INVENTION

The present invention relates to an improvement in digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is a digital camera that includes a method and system for managing a removable memory used in the digital camera.

Figure 2:
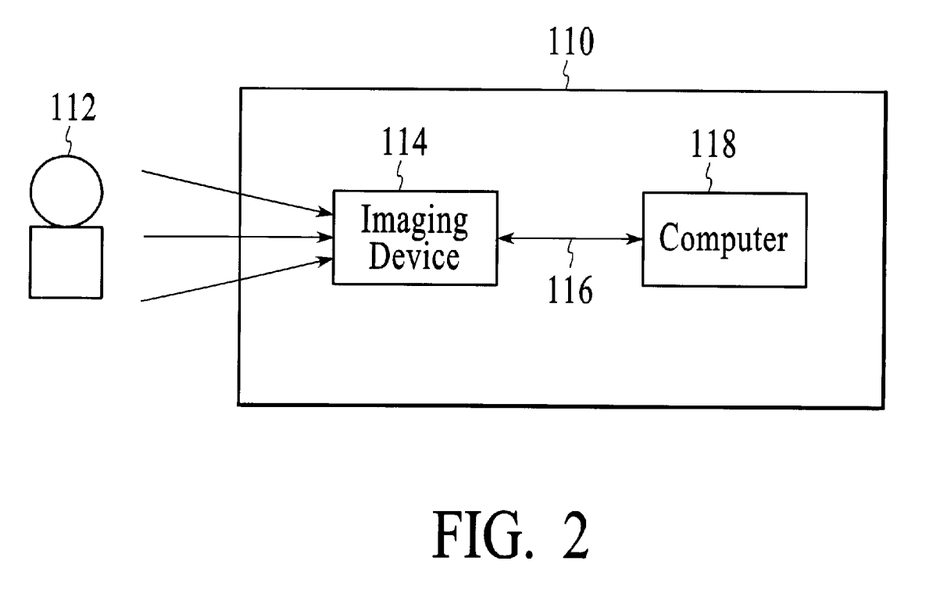
FIG. 2 is a block diagram of a digital camera that operates in accordance with the present invention.

Referring now to FIG. 2, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 3:
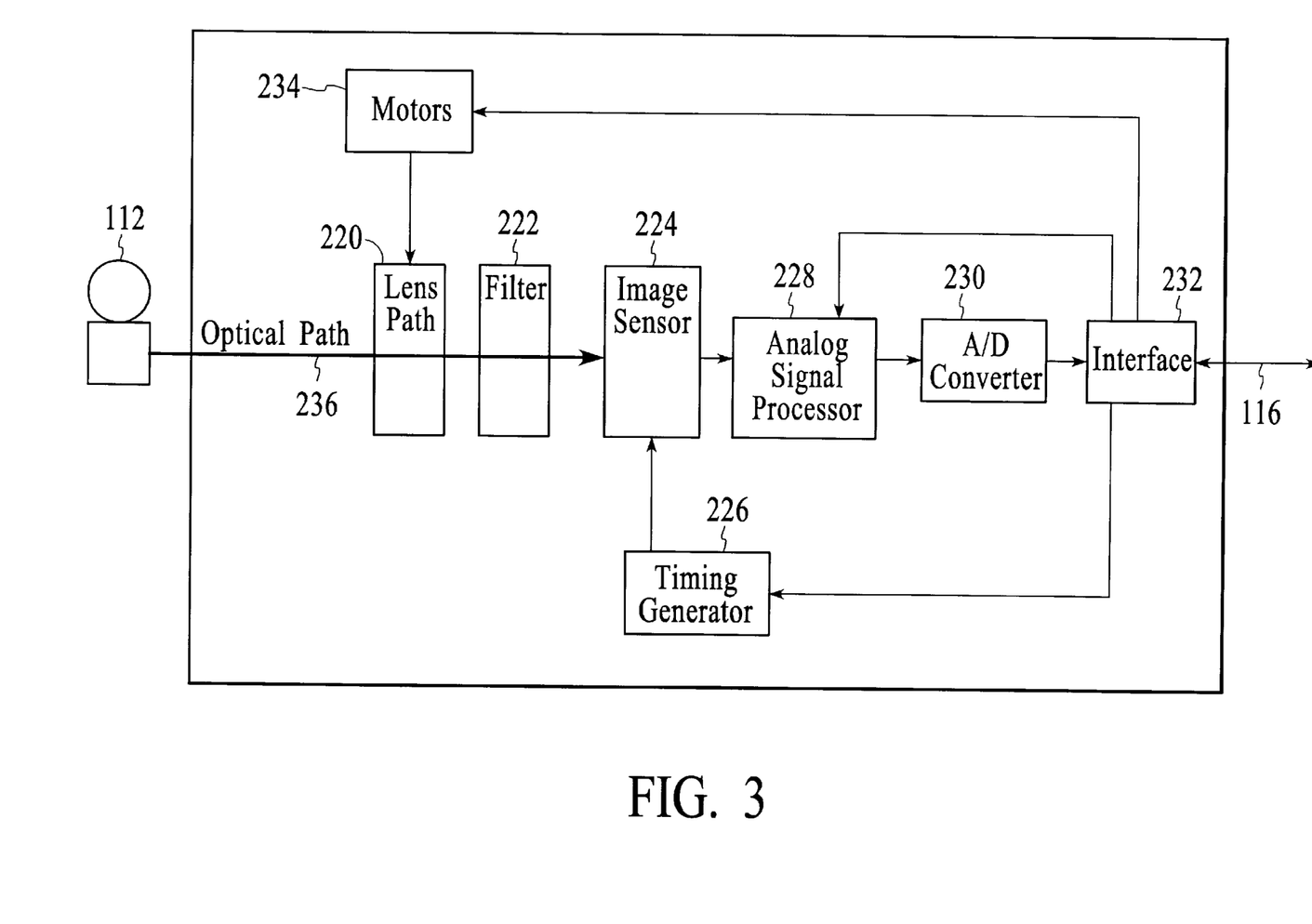
FIG. 3 is a block diagram of one preferred embodiment for the imaging device of FIG. 1.

Referring now to FIG. 3, a block diagram of one preferred embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 4:
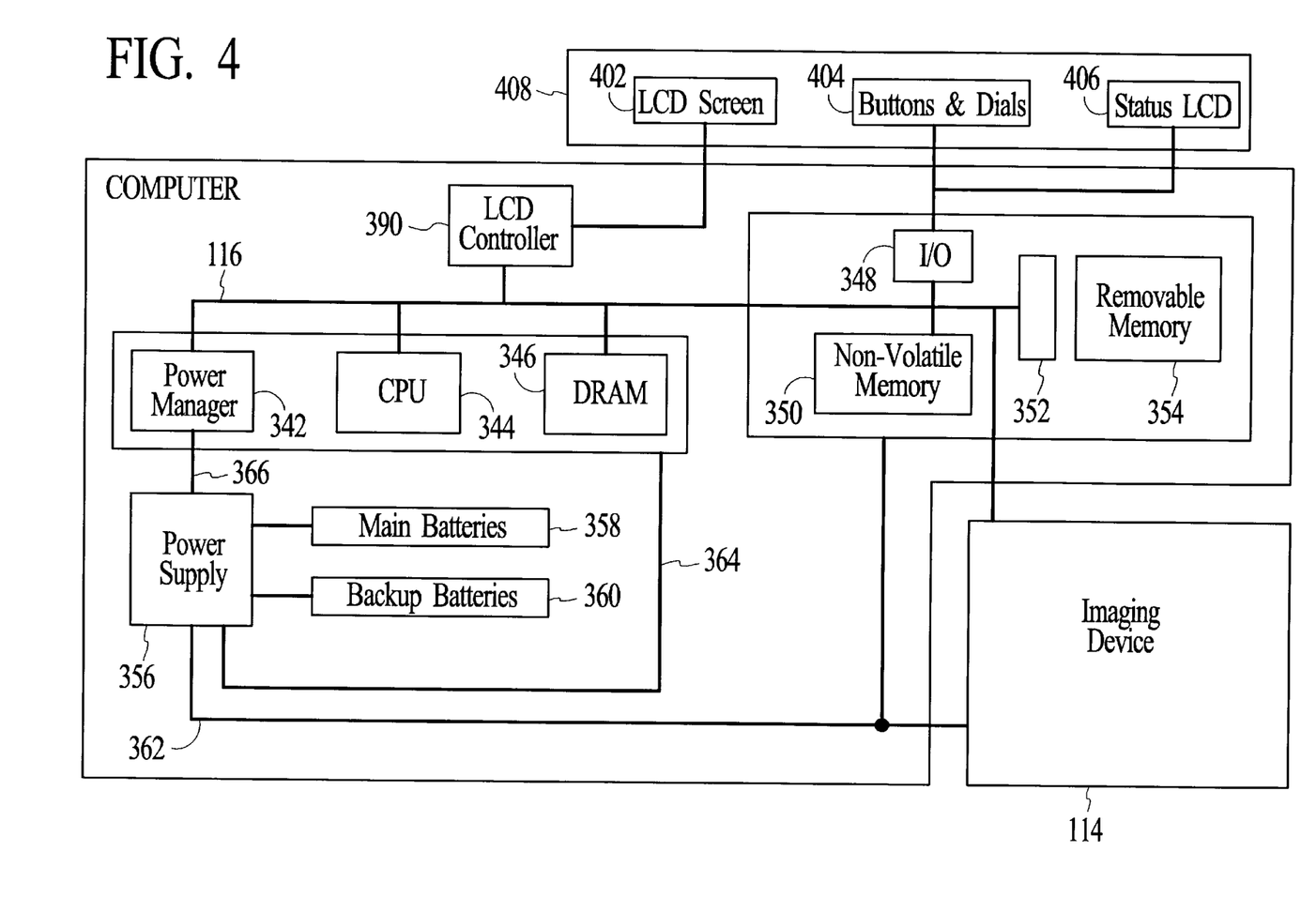
FIG. 4 is a block diagram of one preferred embodiment for the computer of FIG. 1.

Referring now to FIG. 4, a block diagram of one preferred embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded enviromnent. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen a minimum operational voltage level) the backup batteries 360 provide operating power to power supply 356 which then provides the operating power only to the secondary power bus 364 of camera 110.

Figure 5A:
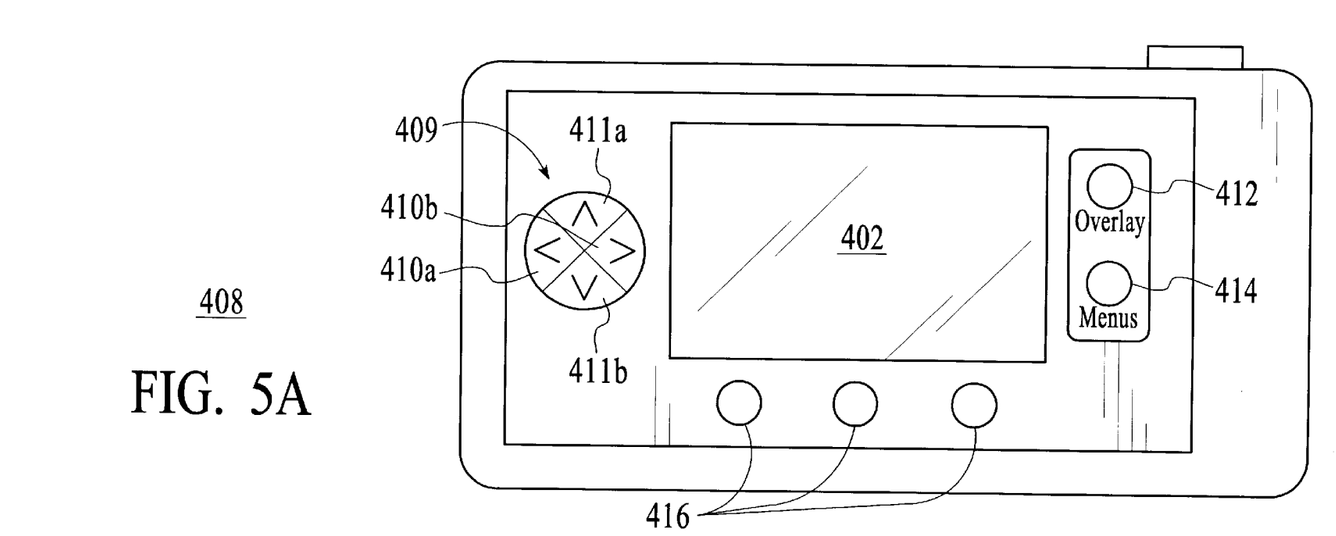
FIGS. 5A and 5B are diagrams depicting the back and top view, respectively, of a digital camera.
Figure 5B:
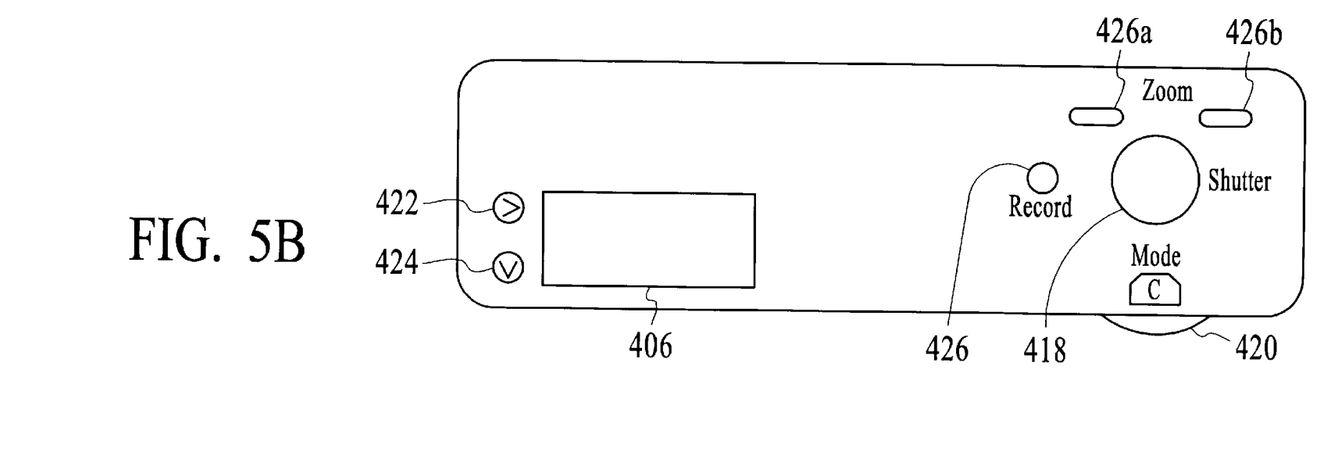

FIGS. 5A and 5B are diagrams depicting the preferred hardware components of the camera's 110 user interface 408. FIG. 5A is back view of the camera 110 showing the LCD screen 402, a four-way navigation control button 409, an overlay button 412, a menu button 414, and a set of programmable soft keys 416. FIG. 5B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

The digital camera is provided with several different operating modes for supporting various camera functions. In capture mode, the camera 100 supports the actions of preparing to capture an image, and capturing an image through the use of either the LCD screen 402 alone or the status LCD 406 with the aid of an optional optical viewfinder (not shown). In review mode, the camera 100 supports the actions of reviewing camera contents, editing and sorting images, and printing and transferring images. In play mode, the camera 100 allows the user to view screen-sized images in the LCD screen 402 in the orientation that the image was captured. Play mode also allows the user to hear recorded sound associated to a displayed image, and to play back sequential groupings of images, which may comprise time lapse, slide show, and burst image images. The user preferably switches between the capture, review, and play modes, using the mode dial 420.

Figure 6:
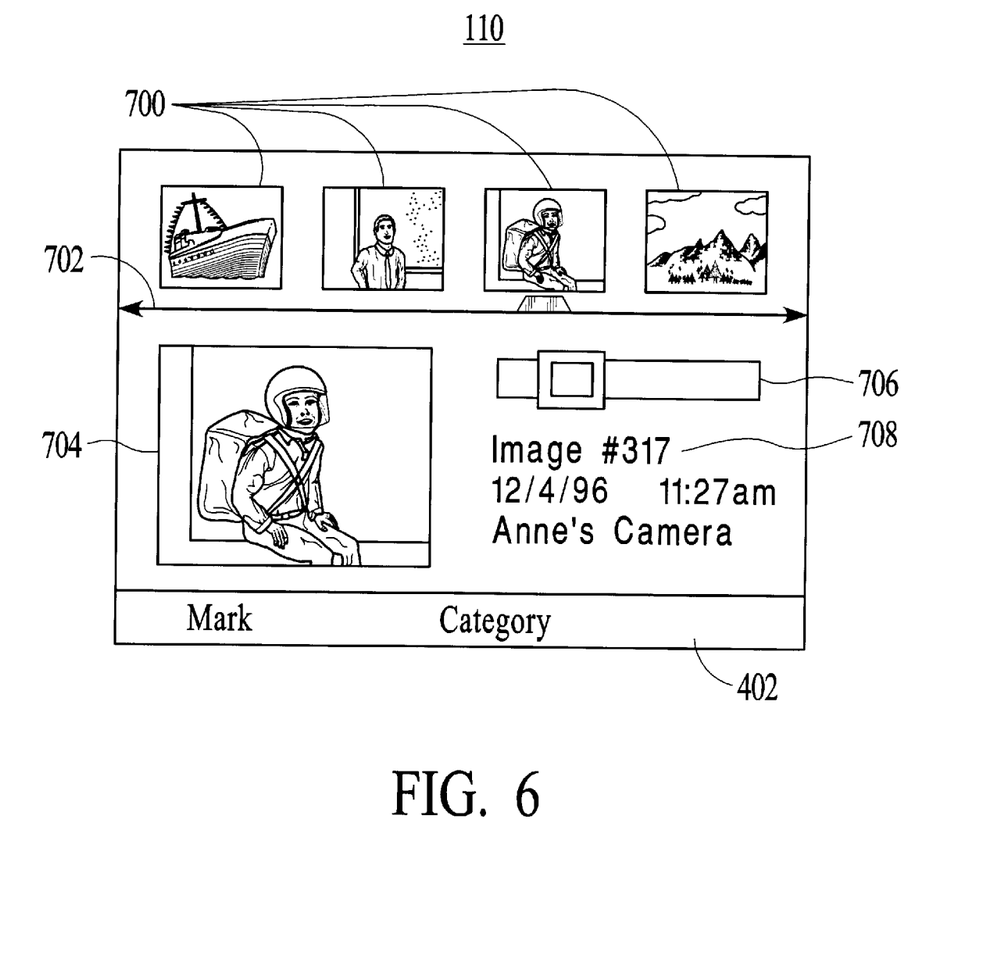
FIG. 6 is a diagram illustrating the operation and appearance of the accelerated user interface during review mode in accordance with a preferred embodiment of the present invention.

Referring now to FIG. 6, a diagram illustrating the operation and appearance of the user interface during review mode is shown in accordance with a preferred embodiment of the present invention. Moving the mode dial 420 (FIG. 5B) or other such button to access the review mode enables the user to view all the images in the camera along with specific attributes associated with of each of the images. In a preferred embodiment, the review screen layout displays four small thumbnails 700 at a time and is based on a filmstrip metaphor which allows users to quickly move forward and backward among pictures chronologically according to date and time.

The user may navigate through the series of small thumbnails 700 in the LCD screen 402 using the four-way navigation control button 409. When the user depresses or holds down the left/right buttons 410, the small thumbnails 700 are scrolled-off the LCD screen 402 and replaced by new small thumbnails 700 representing other captured images to provide for fast browsing of the camera contents. A stationary selection arrow line 702 is used as both a navigational aid and to indicate which small thumbnail 700 is the currently selected image.

After a small thumbnail 700 becomes the currently selected image, additional information corresponding to that image is automatically displayed in the LCD screen 402. In a preferred embodiment, the additional information includes a resized thumbnail 704 showing a larger view (120×90 pixels) of the currently selected image, and image information comprising an icon bar 706 and text 708. The icon bar may display several icons indicating the media types associated with the active image, such as whether the image is a still, a time lapse, or a burst image, whether sound is attached to the image, and a category for the image. The displayed text 708 may include a specification of the name or number of the image, and the date and time the image was captured. The display text in accordance with the present invention will also include the camera name (i.e., Anne's camera) based on an image file format which will be discussed in detail hereinafter.

As stated above, the method by which conventional digital cameras assign names to captured images creates naming conflicts when images are transferred to a host computer or a removable memory from the digital camera, and when images are transferred to the digital camera from a host computer. In both cases, stored images having the same names as the newly transferred images may be overwritten by the transferred images, and therefore lost.

Co-pending U.S. patent application Ser. No. 08/761,854, entitled "A System And Method For Naming Images In A Digital Camera Device," assigned to the Assignee of the present application filed on Dec. 9, 1996 and herein incorporated by reference, minimizes naming conflicts in a single digital camera by incorporating the total number of images captured by the digital camera in the image name.

Another method for minimizing conflicts is described in copending U.S. patent application Ser. No. 08/780,369 entitled, "A Method and System for Managing a Removable Memory in a Digital Camera" filed on Jan. 8, 1997. This method includes creating a camera folder on the removable memory corresponding to the digital camera when the removable memory is first inserted into the digital camera. When images are captured by the digital camera, the images are stored only in that folder. In a preferred embodiment, the folder is made unique by generating a name for the folder from the serial number assigned to the digital camera.

These methods, however, do not resolve the many problems associated with having folders from multiple sessions and multiple devices. In a conventional hierarchy, as previously mentioned, each camera is identified by a serial number. This serial number is utilized to identify the particular folder that is to be accessed. Also, as before mentioned, as the number of images increases within a particular folder, to minimize the complexity in searching for a particular image, each folder will include a plurality of subfolders or section folders for retaining images for a particular session. Accordingly, a two-level system is required in the conventional hierarchy to allow for retrieval of the images in an efficient manner.

A first problem with this kind of hierarchy is that as this type of hierarchy in which there are more and more subfolders, the hierarchy becomes cumbersome as the image numbers become higher. In addition, a second problem is that even though there is a chance that a particular serial number may be identical for two different cameras that are from two different manufacturers. If there is this identity of serial numbers, then there is the possibility that a particular folder that has been created for one camera will be overwritten with images from another camera. A method and system in accordance with the present invention overcomes the above identified problem.

Figure 7:
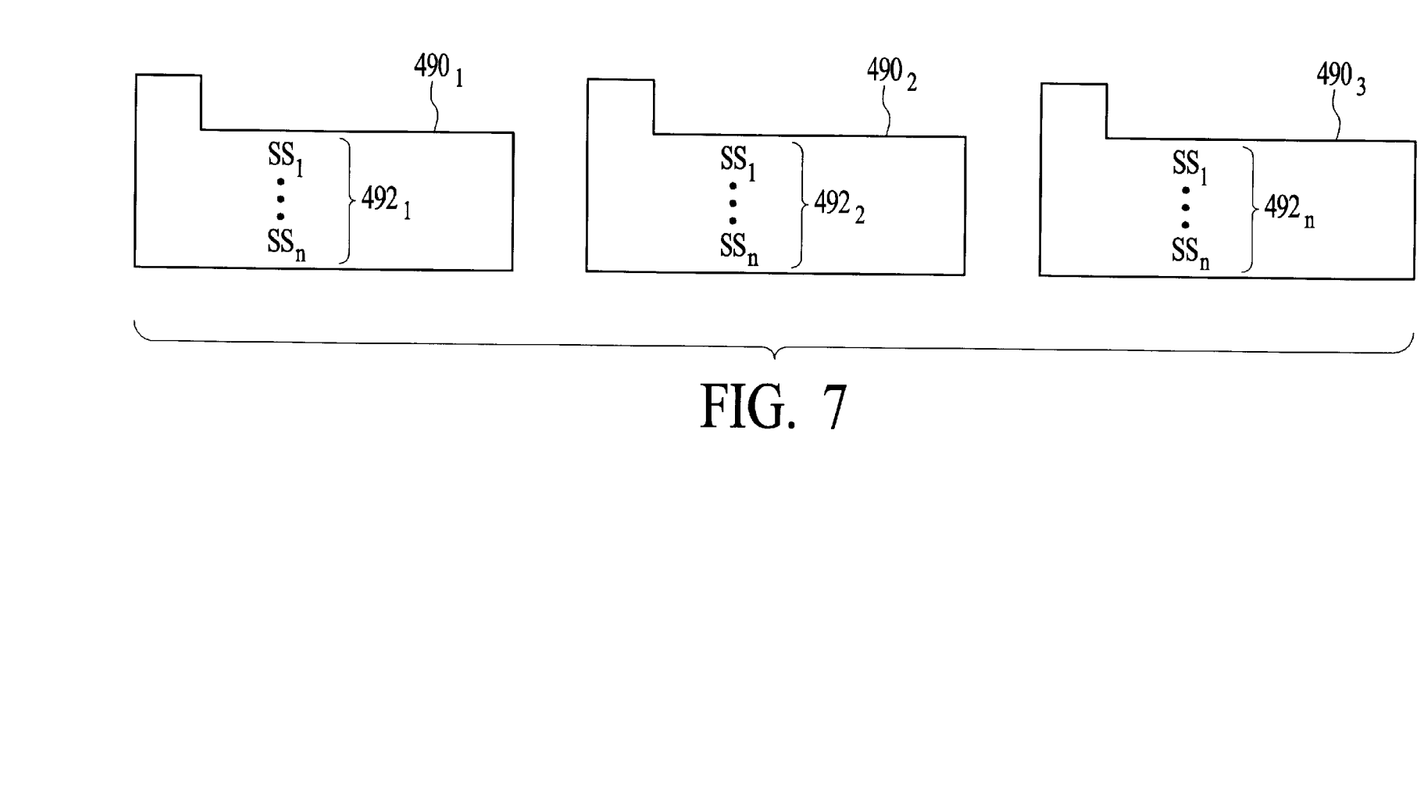
FIG. 7 is a hierarchy for storing images in accordance with the present invention.

To more particularly describe the features and advantages of the present invention refer now to FIG. 7. FIG. 7 is a hierarchy for storing images within a digital camera in accordance with the present invention. The hierarchy comprises a plurality of folders $490_1$–$490_3$ which include the plurality of picture taking sessions $492_1$–$492_3$ located therein. In this type of system, there is only one level of folders rather than the two level system associated with conventional hierarchies as the number of images become larger. This is possible through the use of an image file format such as a TIFF structure.

Figure 8:
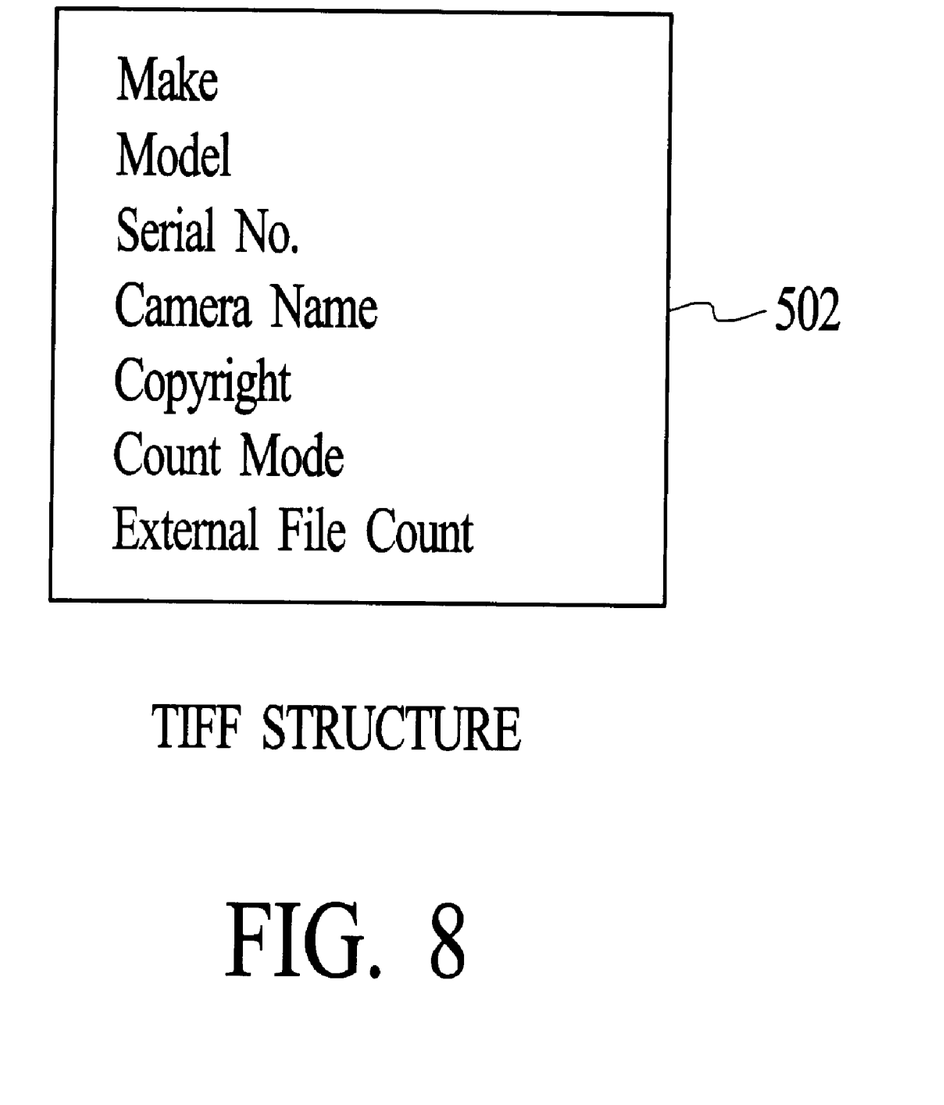
FIG. 8 is an illustration of the elements of a TIFF structure.

FIG. 8 is an illustration of the elements of a TIFF structure. In such a structure, a file 502 is utilized to provide information. That file 504 includes a set of information that identifies the camera. It includes but is not limited to the make of the camera, the model of the camera, the serial number of the camera, the camera name, copyright information, count mode information, and external file count information as is shown.

In the present invention the serial number, make and model of the camera are the most important elements. Through the use of this type of structure, naming conflicts due to identical serial numbers are eliminated due to the additional information (i.e., make, model) that identifies the camera. In addition, by utilizing this file structure, this eliminates the need for subfolders that are utilized in the conventional hierarchy. This elimination is due to the fact that it is now possible to examine this TIFF file to determine whether it is the appropriate camera. The information within the TIFF file identifies a particular camera, rather than just utilizing the serial number of the camera. This system can be utilized to advantage to efficiently generate folders in a variety of environments for multiple devices and for multiple picture-taking sessions.

Figure 9:
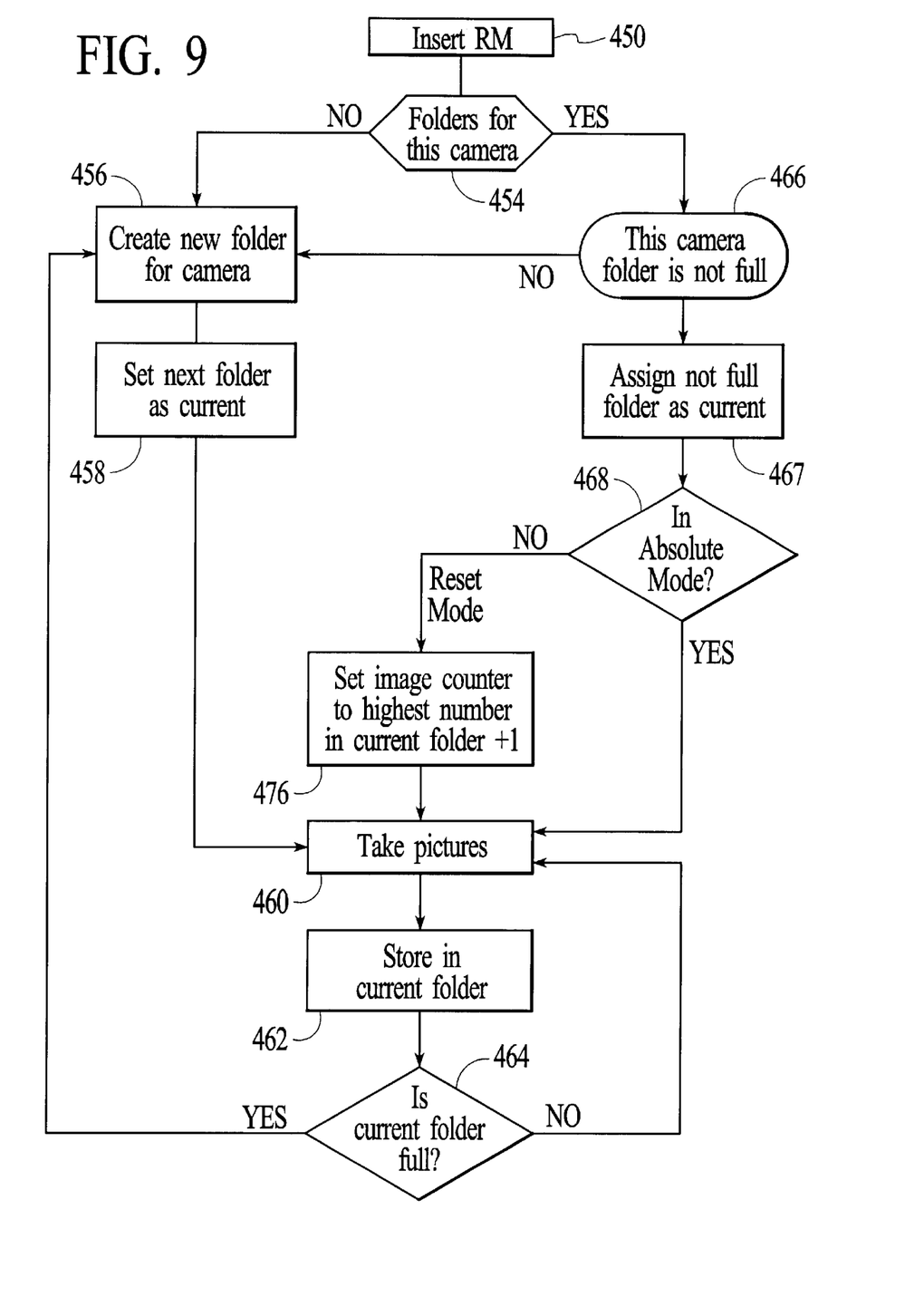
FIG. 9 is a flow chart of the steps involved in automatically generating folders for multiple devices and multiple sessions.

FIG. 9 is a flow chart of the steps involved in automatically generating folders. for multiple devices and multiple sessions. First, the process is described in a hot mount environment that is when mounting a removable memory in a camera. The process begins in step 450 when the removable memory 354 is inserted into the digital camera which generates an interrupt to the operating system.

In response to the interrupt, the operating system scans the removable memory 354 and inventories any folders and images found on the removable memory 354 in step 454 to determine if there are any folders for this camera. If there are no folders for this camera, then a new folder for the camera is created via step 456. The operating system generates the folder name from the serial number stored in the non-volatile memory. After creating the folder name, the operating system attempts to create a folder on the removable memory 354 for the digital camera in step 456. Typically, this is created through a TIFF structure as above described. Thereafter the new folder is set as the current folder, via step 458. Next, pictures can then be taken, via step 460 and they are stored in the current folder, via step 462. When the current folder is full, via step 464, then the process in a preferred embodiment returns to step 456. What is meant by a full folder in the context of this application is that point when it becomes cumbersome to retrieve a folder. In a typical folder this is one hundred images.

In the present invention, typically only one folder within a camera has space therewithin at a time. However, there may be in certain special circumstances a situation where more than one folder is not fill. Accordingly, as an alternative the process could return to step 454.

If, on the other hand, there is a folder for this camera, via step 454, it is then determined, if any of the folders in the camera are not full, via step 466. Next, the not full folder is assigned as the current folder, via step 467. Next, it is determined if the camera is in absolute mode or relative mode, via step 468. If the camera is in the absolute mode the process proceeds from step 460 to step 464.

If, on the other hand, the camera is in the relative mode, then an image counter is set in the highest number in the current folder plus one, via step 476. Next, the pictures are taken via step 460. As is seen, then the process proceeds, via step 462 to step 464.

Figure 10:
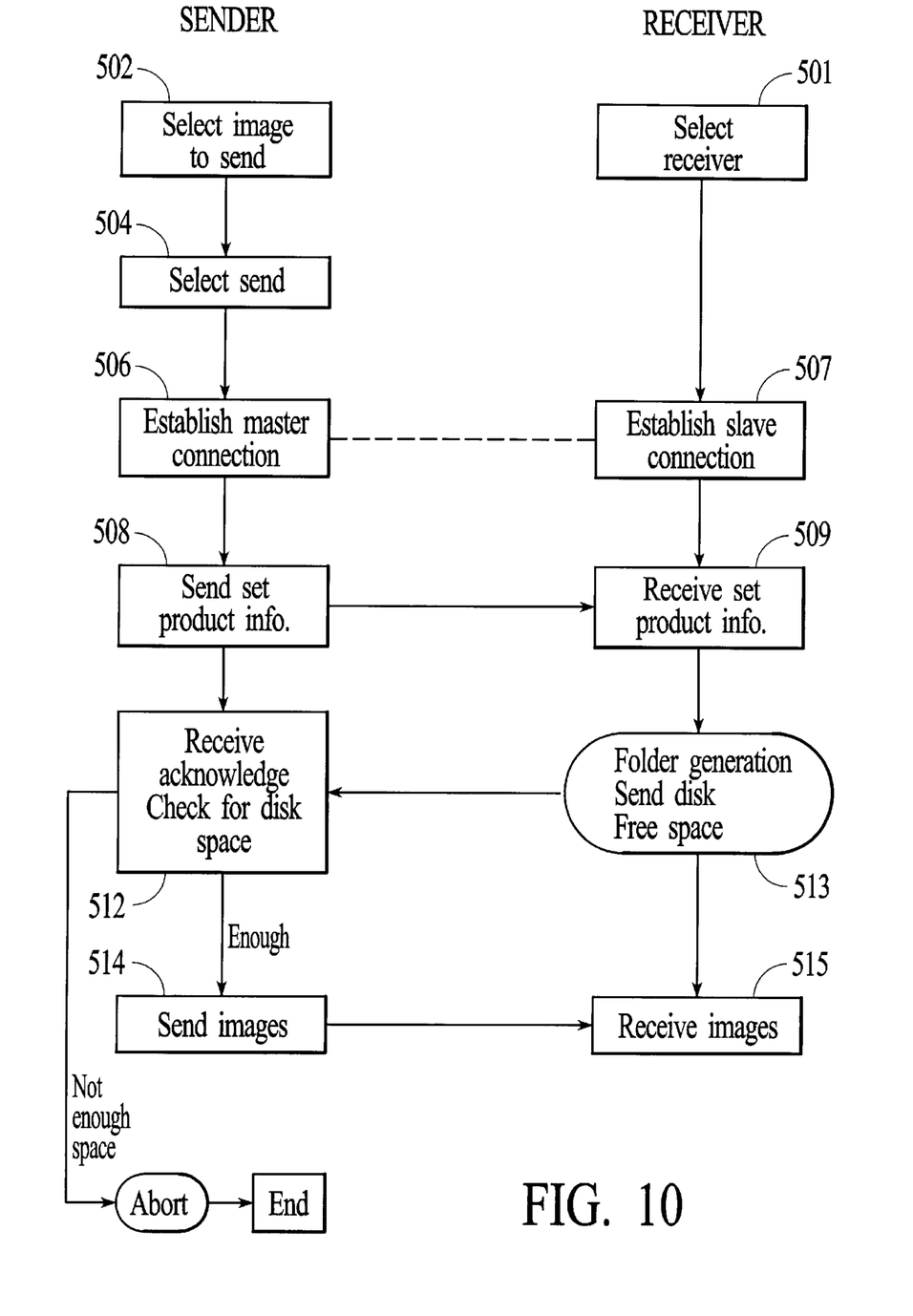
FIG. 10 illustrates the automatic folder generation process in the context of a camera to camera transfer.

FIG. 10 illustrates the automatic folder generation process in the context of a camera to camera transfer. First, the sender camera selects an image to send, via step 502. Then, the send button is pressed. Thereafter a master-slave connection is provided between the sender camera and the receiver camera, via steps 506–507. Thereafter, the product information is sent from sender camera to the receiver camera, via steps 508–509. Thereafter the receiver camera proceeds with the automatic folder generation process in accordance with the present invention via step 513. An acknowledge signal along with the disk free space information is sent from the receiver camera, via step 512 and 513. Thereafter the send camera checks for disk space. If there is not enough disk space then the process is aborted. If there is enough disk space then send images step 514 is invoked. Then the images are sent from the sender camera to the receiver camera, via steps 514 and 515.

Figure 11:
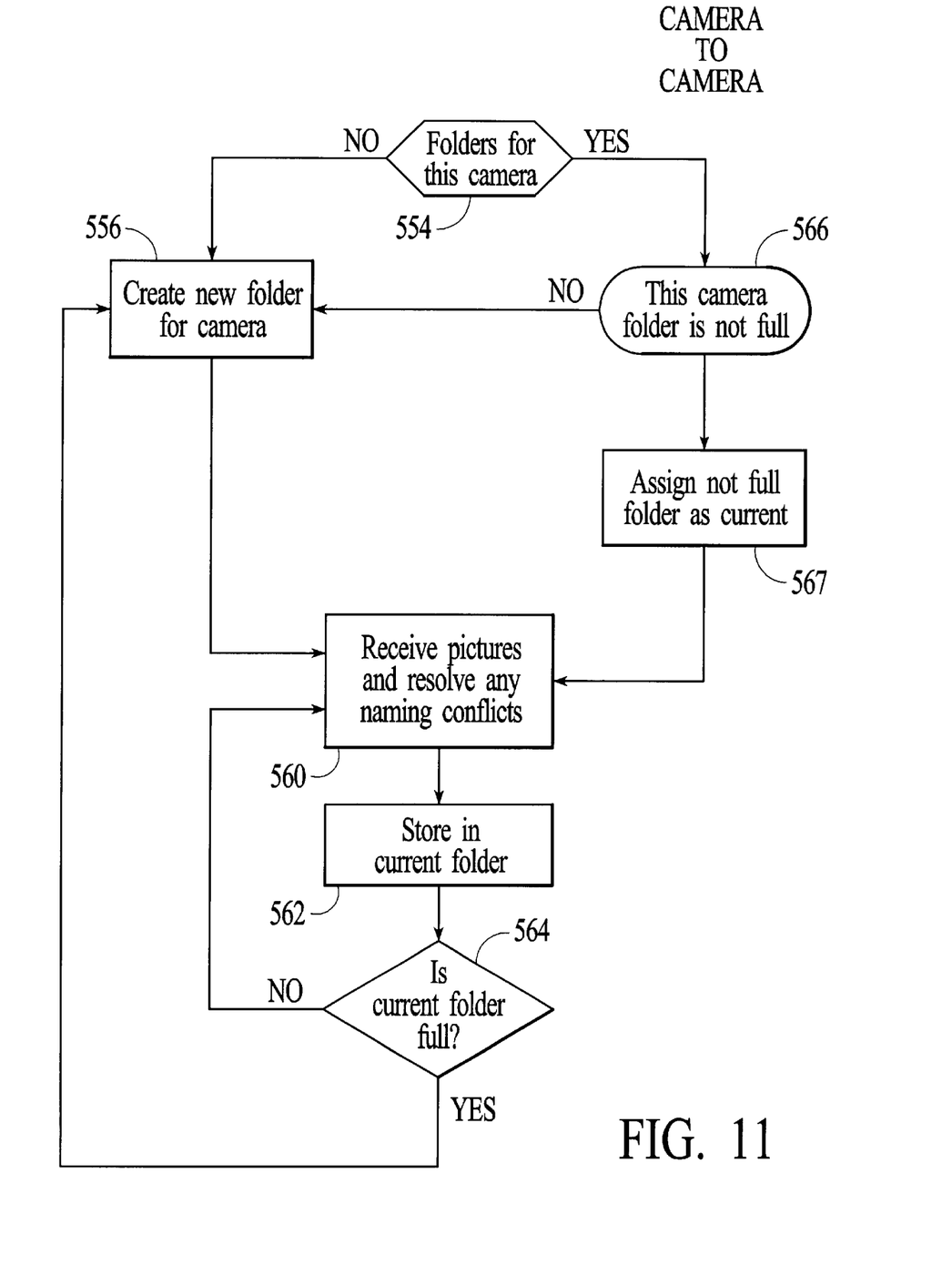
FIG. 11 illustrates steps 513 and 515 of FIG. 10 in more detail.

FIG. 11 illustrates the steps 513 and 515 of FIG. 10 in more detail. In response to the interrupt, the operating system scans the removable memory 354 and inventories any folders and images found on the removable memory 354 in step 554 to determine if there are any folders for this camera. If there are no folders for this camera, then a new folder for the camera is created via step 556. Next, pictures can then be received by the receiving camera, via step 560, and they are stored in the new folder, via step 562. When the current folder is full, via step 564, then the process in a preferred embodiment returns to step 556.

In the present invention, typically only one folder within a camera is not full at a time. However, there may be in certain special circumstances a situation where more than one folder is not full. Accordingly, as an alternative the process could return to step 554.

If, on the other hand, there is a folder for this camera, via step 554, it is then determined, if any of the folders in the camera are not full, via step 566. Next, the not full folder is assigned as the current folder, via step 567. In this mode there may be naming conflicts because the camera that is receiving images may have an image in the folder with the same name as the camera that is sending the image. One way to resolve these conflicts is to add a different prefix to the name of the image from a sending camera as opposed to the receiving camera. Next, the pictures that are received by the receiving camera and any naming conflicts are resolved via step 560. As is seen, then the process proceeds, via step 562 to step 564.

As before mentioned, the automatic folder generation process can also be utilized for transfer of images from a host system to a digital camera.

What is meant by a host system in the context of the present invention includes, but is not limited to, a personal computer, set top box, personal digital assistant (PDA) and the like which can transfer images directly or from an on-line service or the internet.

Unlike a camera to camera connection with a host, a command is typically utilized to initiate uploading the images. The command can either be initiated by the host, for example, by asking the user to provide a name or the like via input on a keyboard or a mouse. On the other hand, there may be a built in feature within the camera to initiate the uploading of the images. The host typically searches the TIFF structure to identify whether a new folder must be generated to upload the images. Inherently, a host has more flexibility than a camera due to the intelligence therewithin.

Figure 12:
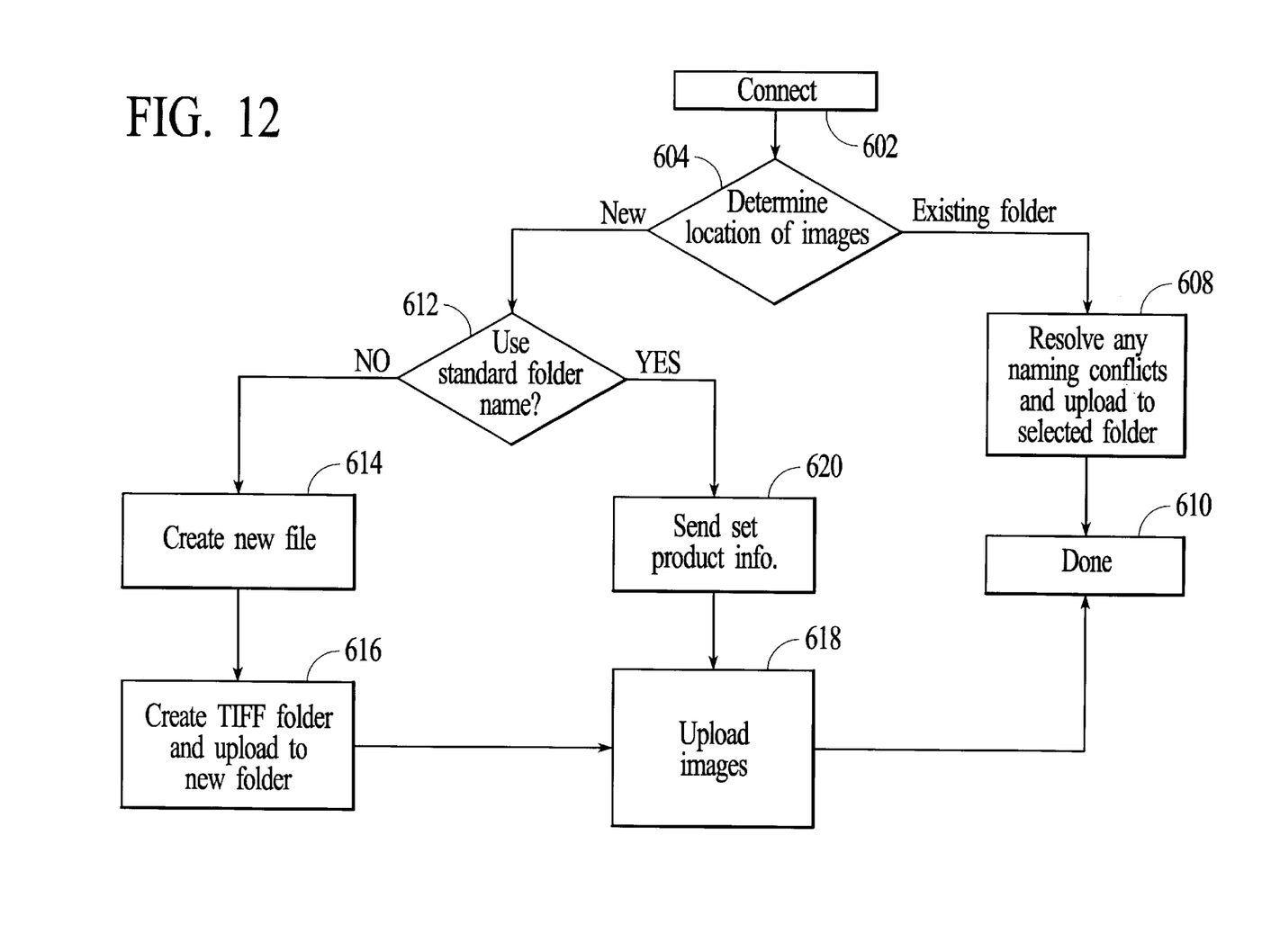
FIG. 12 is a flow chart for providing a host to digital camera transfer.

Referring now to FIG. 12, what is shown is a flow chart for providing a transfer of images from a host system to a digital camera. First, the host is connected to the camera via step 602. It is then determined via a command whether the location of the image is in a new location or in an existing folder within the camera, via step 604. If the image is in an existing folder, then the image is uploaded to the selected folder and any naming conflicts are resolved, via step 608, and then the process is complete, via step 610. If, on the other hand, the location of the image is in a new folder, it is determined whether a standard folder name is utilized, via step 612. If it is a standard folder name, then the product information is set in the folder, via step 620 which automatically creates the TIFF file in the newly created folder. Then the images are uploaded, via step 618. Thereafter the process is complete, via step 610. If, on the other hand, the folder does not have a standard folder name, then a new folder is created of the given information, via step 614. Next a new TIFF file is created and uploaded to the new folder, via step 616. Thereafter, the images are uploaded, via step 618. Thereafter the process is complete, via step 606.

A method and system for automatically generating folders in a digital camera has been disclosed that allows for efficient generation and retrieval of images from folders and also avoids name conflicts. As is readily apparent, this system can be utilized in the hot mount, camera to camera or host to camera environment. Through the present invention naming conflicts due to identical serial numbers are eliminated through the use of an image file format such as a TIFF structure. Additionally, through a system and method in accordance with the present invention, subfolders are not necessary and only one level is required when retrieving images. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for automatically generating folders in a digital camera comprising the steps of:
   a) determining if there are any folders related to the digital camera; if there are not folders related to the camera,
   b) creating a new folder;
   c) assigning a new folder as current folder;
   d) providing and storing images for the current folder until the current folder is full, by the steps of:
      d1) determining if the camera is in absolute mode;
      d2) setting the next not full folder as the current folder if the camera is in the absolute mode; and
      d3) providing and storing pictures for the current folder;
   e) repeating steps (b)–(d) until all images are stored; if there are folders related to the camera,
   f) determining if there are any folders in the camera that are not full;
   g) assigning a not full folder as the current folder; and
   h) repeating step (d).

2. The method of claim 1 wherein the providing and storing step (d) includes the step of taking pictures by the digital camera.

3. The method of claim 1 wherein the providing and storing step (d) includes the step of sending pictures to the digital camera from another digital camera.

* * * * *